US012629632B2

(12) United States Patent
Umeda et al.

(10) Patent No.: US 12,629,632 B2
(45) Date of Patent: May 19, 2026

(54) CARBON DIOXIDE RECOVERY SYSTEM AND WORKING ELECTRODE

(71) Applicant: DENSO CORPORATION, Kariya (JP)

(72) Inventors: Hiroaki Umeda, Kariya (JP); Go Iijima, Kariya (JP)

(73) Assignee: DENSO CORPORATION, Kariya (JP)

( * ) Notice: Subject to any disclaimer, the term of this patent is extended or adjusted under 35 U.S.C. 154(b) by 931 days.

(21) Appl. No.: 17/505,960

(22) Filed: Oct. 20, 2021

(65) Prior Publication Data

US 2022/0118401 A1 Apr. 21, 2022

(30) Foreign Application Priority Data

Oct. 20, 2020 (JP) ................................ 2020-176292

(51) Int. Cl.
*B01D 53/32* (2006.01)
*B01D 53/02* (2006.01)
(Continued)

(52) U.S. Cl.
CPC ........... *B01D 53/326* (2013.01); *B01D 53/02* (2013.01); *C25B 11/031* (2021.01); *C25B 11/04* (2013.01);
(Continued)

(58) Field of Classification Search
CPC .................. B01D 53/02; B01D 53/326; B01D 2257/504; B01D 53/0462; B01D 53/047; B01D 53/0473; B01D 53/0476; B01D 53/053; C25B 11/031; C25B 11/04; C25B 3/00; C25B 3/25; C25B 3/26
(Continued)

(56) References Cited

U.S. PATENT DOCUMENTS 11,598,012 B2 * 3/2023 Voskian ................ C25B 11/031
11,964,232 B2 * 4/2024 Umeda ................ C25B 11/031
(Continued)

FOREIGN PATENT DOCUMENTS

EP 2 145 668 A1 1/2010
EP 2 727 882 A1 5/2014
(Continued)

OTHER PUBLICATIONS

Marr and Marr ("Ionic liquid gel materials: applications in green and sustainable chemistry" Green Chem., 2016, 18, 105) (Year: 2016).*

(Continued)

*Primary Examiner* — Luan V Van
*Assistant Examiner* — Alexander R. Parent
(74) *Attorney, Agent, or Firm* — Oliff PLC

(57) ABSTRACT

Provided is an electrochemical cell comprising a working electrode and a counter electrode. The working electrode comprises an electrode base material, a $CO_2$ adsorbent, and a binder. Application of a voltage between the working electrode and the counter electrode causes electrons to be supplied from the counter electrode to the working electrode, and enables the $CO_2$ adsorbent to bind to $CO_2$ as electrons are supplied. The binder has electrical conductivity, and the $CO_2$ adsorbent is held in the electrode base material by the binder.

7 Claims, 5 Drawing Sheets

(51) Int. Cl.

| | |
|---|---|
| ***C25B 11/031*** | (2021.01) |
| ***C25B 11/04*** | (2021.01) |
| *C25B 3/26* | (2021.01) |
| *C25B 15/08* | (2006.01) |

(52) U.S. Cl.
CPC .......... *B01D 2257/504* (2013.01); *C25B 3/26* (2021.01); *C25B 15/08* (2013.01)

(58) Field of Classification Search
USPC .......................................................... 205/763
See application file for complete search history.

(56) References Cited

U.S. PATENT DOCUMENTS

| | | | |
|---|---|---|---|
| 2012/0290323 A1 | 11/2012 | Barsoum et al. | |
| 2014/0102883 A1* | 4/2014 | Kamai | C25B 11/031 204/242 |
| 2017/0113182 A1 | 4/2017 | Voskian et al. | |
| 2018/0265899 A1 | 9/2018 | Noritomi et al. | |
| 2020/0002829 A1 | 1/2020 | Kudo et al. | |
| 2020/0023307 A1 | 1/2020 | Voskian et al. | |
| 2021/0060485 A1* | 3/2021 | Voskian | C25B 9/15 |
| 2021/0387139 A1* | 12/2021 | Voskian | B01D 53/326 |

FOREIGN PATENT DOCUMENTS

| | | | | |
|---|---|---|---|---|
| EP | 4 049 745 A1 | | 8/2022 | |
| JP | 2008-129481 A | † | 6/2008 | |
| JP | 2015-036128 A | | 2/2015 | |
| JP | 2015025056 A | * | 2/2015 | C08F 2/44 |
| JP | 2017-125234 A | † | 7/2017 | |
| JP | 2022-025699 A | | 2/2022 | |
| WO | 2017/075014 A1 | † | 5/2017 | |
| WO | 2020/113281 A1 | | 6/2020 | |

OTHER PUBLICATIONS

Benedetti et al. ("Solid-State Poly(ionic liquid) Gels for Simultaneous CO2 Adsorption and Electrochemical Reduction" Energy Technol. 2018, 6, 702-709) (Year: 2018).*

Voskian and Hatton ("Faradaic electro-swing reactive adsorption for CO2 capture" Energy Environ. Sci., 2019, 12, 3530) (Year: 2019).*

Kunanusont and Shimoyma ("Porous Carbon Cathode Assisted with lonogel Binder Fabricated from Supercritical Fluid Technique toward Li-O2/CO2 Battery Application" ACS Appl. Energy Mater. 2020, 3, 4421-4431) (Year: 2020).*

Adtech "Fluoropolymers Gas Permeability" (2020) adtech.co.uk./application/files/7416/0500/0820/Adtech_Fluoropolymers_Gas_Permeability_2020.pdf (Year: 2020).*

Koichi Nakamura; "Structual adhesive"; Technical Report No. 56; Publisher: Torao Higaki, CMC Corporation; May 21, 1984.

Eri Hayashi et al.; "Application of Protic Ionic Liquids to CO2 Separation in a Sulfonated Polyimide-Derived Ion Gel Membrane"; ACS Applied Polymer Materials; 2019; vol. 1; pp. 1579-1589.

Qinian Wang et al.; "Electrodeposition of tin on Nafion-bonded carbon black as an active catalyst layer for efficient electroreduction of CO2 to formic acid"; Scientific Reports; 2017; vol. 7; No. 13711; pp. 1-11.

Kamio, Eiji et al.;"Development of Ionic Liquid Type Gas Separation Membrane"; Membrane Engineering Group, Graduate School of Engineering; Kobe University; pp. 1-7. Accessed from http://www2.kobe-u.ac.jp/~matuyama/cx14HP/research/research-summary-gas-sep-i.html?

Iijima et al.; U.S. Appl. No. 17/744,837, filed May 16, 2022.

Umeda et al.; U.S. Appl. No. 17/515,666; filed Nov. 1, 2021.

Ogura et al.; U.S. Appl. No. 17/681,896, filed Feb. 28, 2022.

Li, Siwu et al., "Carbon dioxide in the cage: manganese metal-organic frameworks for high performance CO2 electrodes in Li—CO2 batteries". Energy & Environmental Science, vol. 11, Issue 5, p. 1318-1325. Mar. 2018. DOI: 10.1039/c8ee00415c.

* cited by examiner
† cited by third party

CO₂ DISCHARGE MODE e⁻

100

CO₂ DESORPTION

CO₂ GAS

105

101

102

104

103

CO₂ RECOVERY MODE e⁻

100

CO₂-CONTAINING GAS

CO₂ ADSORPTION

CO₂-REMOVED GAS

105

101

102

104

103

CARBON DIOXIDE RECOVERY SYSTEM AND WORKING ELECTRODE

CROSS-REFERENCE TO RELATED APPLICATION

This application is based on and claims the benefit of priority from earlier Japanese Patent Application No. 2020-176292 filed Oct. 20, 2020, the description of which is incorporated herein by reference.

BACKGROUND

The present invention relates to a carbon dioxide recovery system that recovers $CO_2$ from a $CO_2$-containing gas, and a working electrode used in the carbon dioxide recovery system.

There has been known a gas separation system that separates $CO_2$ from a $CO_2$-containing gas by an electrochemical reaction.

SUMMARY

A carbon dioxide recovery system according to an aspect of the present disclosure is a carbon dioxide recovery system that separates $CO_2$ from a $CO_2$-containing gas, comprising an electrochemical cell comprising a working electrode and a counter electrode, wherein the working electrode comprises an electrode base material, a $CO_2$ adsorbent, and a binder, application of a voltage between the working electrode and the counter electrode the $CO_2$ adsorbent to bind to $CO_2$, and the binder has electrical conductivity, and the $CO_2$ adsorbent is held in the electrode base material by the binder.

DETAILED DESCRIPTION OF THE PREFERRED EMBODIMENTS

Figure 1:
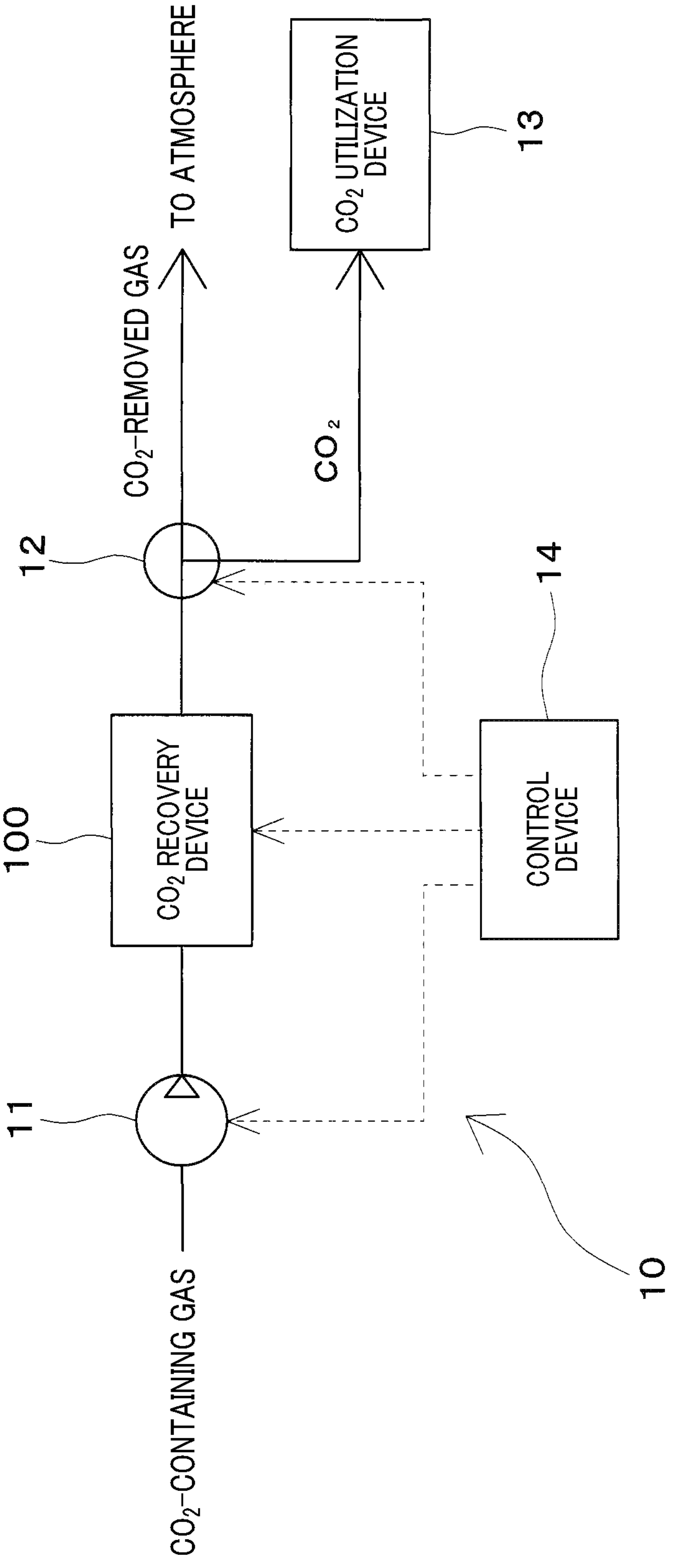
FIG. 1 is a conceptual diagram of a carbon dioxide recovery system according to an embodiment of the present invention.

In JP 2018-533470 A, a gas separation system that separates $CO_2$ from a $CO_2$-containing gas by an electrochemical reaction is proposed. In this gas separation system, the working electrode of an electrochemical cell is provided with a $CO_2$ adsorbent which is capable of adsorbing $CO_2$.

The $CO_2$ adsorbent is an electroactive species, and by changing the potential difference between the working electrode and the counter electrode, it is possible to switch between adsorption and discharging of $CO_2$ by the $CO_2$ adsorbent.

However, in the configuration of the conventional technique described above, there is a possibility that the $CO_2$ adsorbent of the working electrode may become detached from the electrode base material when used for a long period of time. Consequently, the amount of $CO_2$ adsorbed by the electrochemical cell may decrease over time.

In view of the above points, the present invention has an object of providing a carbon dioxide recovery system which is capable of suppressing a decrease in the amount of $CO_2$ adsorbed by an electrochemical cell over time, and a working electrode used in the carbon dioxide recovery system.

In order to achieve the above object, a carbon dioxide recovery system according to an aspect of the present disclosure is a carbon dioxide recovery system that separates $CO_2$ from a $CO_2$-containing gas containing $CO_2$ by an electrochemical reaction, comprising an electrochemical cell (101) comprising a working electrode (102) and a counter electrode (103), wherein the working electrode comprises an electrode base material (102a), a $CO_2$ adsorbent (102b), and a binder (102c), application of a voltage between the working electrode and the counter electrode causes electrons to be supplied from the counter electrode to the working electrode, and enables the $CO_2$ adsorbent to bind to $CO_2$ as electrons are supplied, and the binder has electrical conductivity, and the $CO_2$ adsorbent is held in the electrode base material by the binder.

According to the above aspect of the present disclosure, the $CO_2$ adsorbent is held in the electrode base material by using a binder. As a result, the $CO_2$ adsorbent is less likely to become detached from the electrode base material, and a decrease in the amount of $CO_2$ adsorbed by the electrochemical cell over time can be suppressed.

Hereinafter, an embodiment of the present invention will be described using the drawings. As shown in FIG. 1, the carbon dioxide recovery system 10 of the present embodiment includes a compressor 11, a $CO_2$ recovery device 100, a flow path switching valve 12, a $CO_2$ utilization device 13, and a control device 14.

The compressor 11 pumps a $CO_2$-containing gas to the $CO_2$ recovery device 100. The $CO_2$-containing gas is a mixed gas containing $CO_2$ and a gas other than $CO_2$. For example, air or an exhaust gas of an internal combustion engine can be used.

The $CO_2$ recovery device 100 is a device that separates and recovers $CO_2$ from the $CO_2$-containing gas. The $CO_2$ recovery device 100 discharges a $CO_2$-removed gas after $CO_2$ is recovered from the $CO_2$-containing gas, or discharges the $CO_2$ recovered from the $CO_2$-containing gas. The configuration of the $CO_2$ recovery device 100 will be described in detail later.

The flow path switching valve 12 is a three-way valve that switches the flow path of the discharged gas from the $CO_2$ recovery device 100. When a $CO_2$-removed gas is discharged from the $CO_2$ recovery device 100, the flow path switching valve 12 switches the flow path of the discharged gas to the atmosphere side. When $CO_2$ is discharged from the $CO_2$ recovery device 100, the flow path of the discharged gas is switched to the $CO_2$ utilization device 13 side.

The $CO_2$ utilization device 13 is a device that utilizes $CO_2$. Examples of the $CO_2$ utilization device 13 include a storage tank that stores $CO_2$, and a conversion device that converts $CO_2$ into a fuel. The conversion device may use a device that converts $CO_2$ into a hydrocarbon fuel such as methane. The hydrocarbon fuel may be a gaseous fuel at ordinary temperature and pressure, or a liquid fuel at ordinary temperature and pressure.

The control device 14 is composed of a known microcomputer including a CPU, a ROM, a RAM, and the like, and the peripheral circuits of the microcomputer. The control device 14 performs various calculations and processing based on a control program stored in the ROM, and controls the operation of various controlled devices. The control device 14 of the present embodiment performs operation control of the compressor 11, operation control of the $CO_2$ recovery device 100, flow path switching control of the flow path switching valve 12, and the like.

Figure 2:
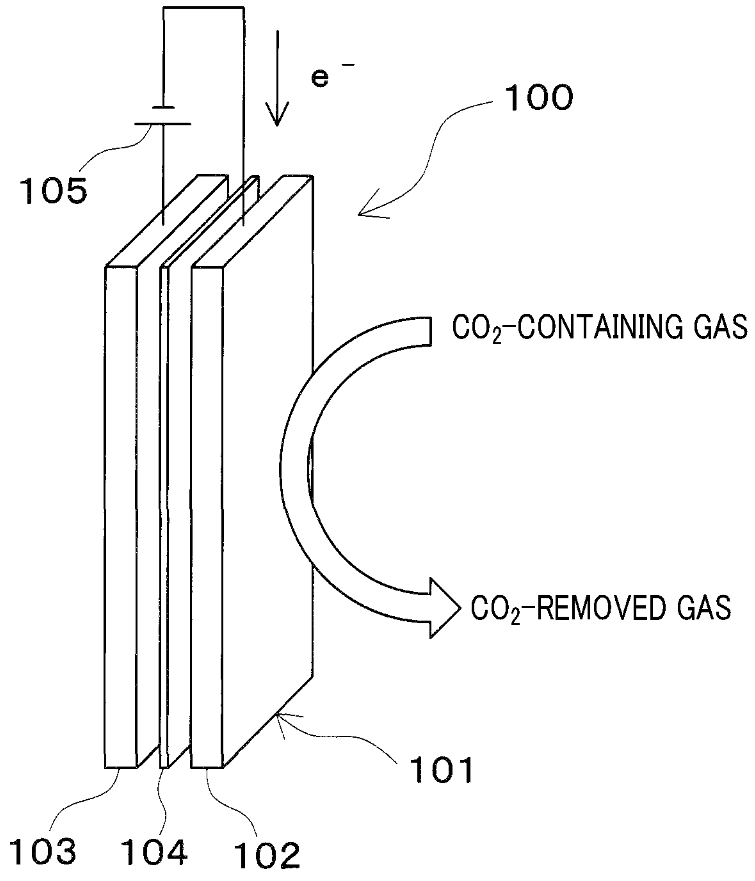
FIG. 2 is a conceptual diagram of a $CO_2$ recovery device.

Next, the $CO_2$ recovery device 100 will be described using FIG. 2. As shown in FIG. 2, the $CO_2$ recovery device 100 includes an electrochemical cell 101. The electrochemical cell 101 includes a working electrode 102, a counter electrode 103, and an insulating layer 104. In the example shown in FIG. 2, the working electrode 102, the counter electrode 103, and the insulating layer 104 each have a plate shape. Although the working electrode 102, the counter electrode 103, and the insulating layer 104 are shown in FIG. 2 with a spacing between them, in reality these components are arranged so as to be in contact with each other.

The electrochemical cell 101 may be housed inside a container (not shown). The container may comprise a gas inlet for allowing the $CO_2$-containing gas to flow into the container, and a gas outlet for allowing the $CO_2$-removed gas or $CO_2$ to flow out of the container.

The $CO_2$ recovery device 100 adsorbs and desorbs $CO_2$ by an electrochemical reaction, and is capable of separating and recovering $CO_2$ from the $CO_2$-containing gas. The $CO_2$ recovery device 100 has a power supply 105 that applies a predetermined voltage to the working electrode 102 and the counter electrode 103, and is capable of changing the potential difference between the working electrode 102 and the counter electrode 103. The working electrode 102 is the negative electrode, and the counter electrode 103 is the positive electrode.

The electrochemical cell 101 operates by switching between a $CO_2$ recovery mode, in which $CO_2$ is recovered at the working electrode 102, and a $CO_2$ discharge mode, in which $CO_2$ is discharged from the working electrode 102, by changing the potential difference between the working electrode 102 and the counter electrode 103. The $CO_2$ recovery mode is a charging mode that charges the electrochemical cell 101. The $CO_2$ discharge mode is a discharging mode that discharges the electrochemical cell 101.

In the $CO_2$ recovery mode, a first voltage is applied between the working electrode 102 and the counter electrode 103, and electrons are supplied from the counter electrode 103 to the working electrode 102. At the first voltage, the working electrode potential is lower than the counter electrode potential. The first voltage can be, for example, in the range of 0.5 to 2.0 V.

In the $CO_2$ discharge mode, a second voltage is applied between the working electrode 102 and the counter electrode 103, and electrons are supplied from the working electrode 102 to the counter electrode 103. The second voltage is a lower voltage than the first voltage, and the magnitude relationship between the working electrode potential and the counter electrode potential is not limited. That is to say, in the $CO_2$ discharge mode, the working electrode potential may be lower than the counter electrode potential, the working electrode potential may be equal to the counter electrode potential, or the working electrode potential may be higher than the counter electrode potential.

Figure 3:
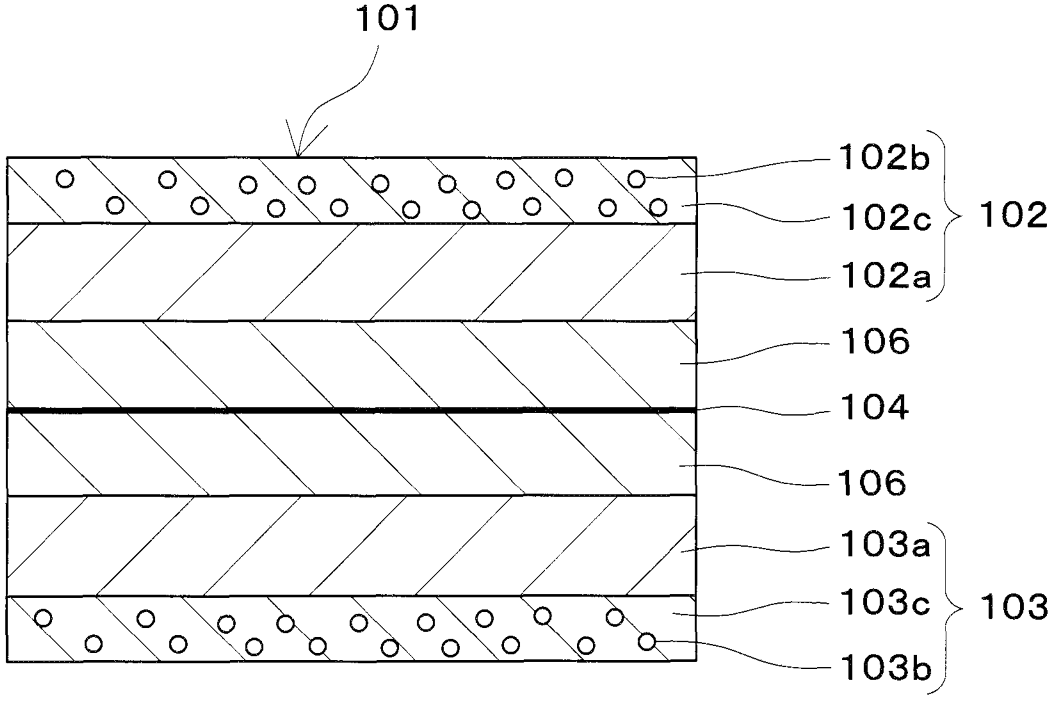
FIG. 3 is a cross-sectional view of an electrochemical cell.

As shown in FIG. 3, the working electrode 102 includes a working electrode base material (electrode base material) 102*a* and a $CO_2$ adsorbent 102*b*. For convenience, FIG. 3 is illustrated with the $CO_2$ adsorbent 102*b* located on the outside of the working electrode base material 102*a*. However, in reality the $CO_2$ adsorbent 102*b* is provided inside the porous working electrode base material 102*a*.

The working electrode base material 102*a* is a porous and electrically conductive material which is capable of enabling $CO_2$ to pass through. Examples of the working electrode base material 102*a* include carbonaceous materials and metallic materials. Examples of carbonaceous materials that can be used to form the working electrode base material 102*a* include carbon paper, carbon cloth, non-woven carbon mats, and porous gas diffusion layers (GDL). Examples of metallic materials that can be used to form the working electrode base material 102*a* include structures in which a metal (such as Al or Ni) has been processed into a mesh form.

The $CO_2$ adsorbent 102*b* is redox active, and contains a material which is an electroactive species capable of reversibly causing a redox reaction. The $CO_2$ adsorbent 102*b* is capable of binding and adsorbing $CO_2$ when in a reduced state, and discharging $CO_2$ when in an oxidized state.

The $CO_2$ adsorbent 102*b* has a functional group that binds to $CO_2$. The functional group that binds to $CO_2$ exchanges electrons and serves as a $CO_2$ adsorption site. Examples of the functional group that binds to $CO_2$ include atoms having a high electronegativity (such as F, O, N, Cl, and S). For example, a ketone group (C═O) can be used.

In the present embodiment, a polyanthraquinone, which is an organic polymer having a ketone group, is used as the $CO_2$ adsorbent 102*b*. Examples of the polyanthraquinone include poly(1,4-anthraquinone), poly(1,5-anthraquinone), poly(1,8-anthraquinone), and poly(2,6-anthraquinone). In the present embodiment, more specifically, poly(1,4-anthraquinone) as shown below can be used as the $CO_2$ adsorbent 102*b*.

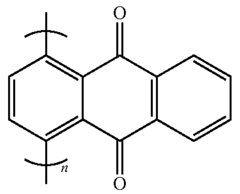

The $CO_2$ adsorbent 102*b* may be mixed with an electrically conductive material such as carbon nanotubes, carbon black, or graphene. That is to say, by employing and mixing an electrically conductive material with the $CO_2$ adsorbent 102*b*, the electrically conductive material is capable of forming an electrically conductive path to the $CO_2$ adsorbent 102*b*.

The mixing of the $CO_2$ adsorbent and the electrically conductive material may be carried out, for example, by dissolving the electrically conductive material in an organic solvent such as NMP (N-methylpyrrolidone), and then bringing the electrically conductive material dispersed in the organic solvent into contact with the $CO_2$ adsorbent 102*b*. The contact between the electrically conductive material and the $CO_2$ adsorbent 102*b* can be achieved by a dip coating method or the like, in which the working electrode base material 102*a* containing the $CO_2$ adsorbent 102*b* is immersed in the solvent in which the electrically conductive material has been dispersed. As a result, the electrically conductive material can be uniformly brought into contact with the $CO_2$ adsorbent 102*b*.

A working electrode binder (binder) 102*c* is provided between the working electrode base material 102*a* and the $CO_2$ adsorbent 102*b*. The working electrode binder 102*c* has an adhesive force, and holds the $CO_2$ adsorbent 102*b* in the working electrode base material 102*a*.

The working electrode binder 102*c* contains an electrically conductive material having electrical conductivity. As a result, the transfer of electrons between the working electrode base material 102*a* and the $CO_2$ adsorbent 102*b* can be ensured.

In the present embodiment, the $CO_2$ adsorbent 102*b* and the working electrode binder 102*c* are used as a mixture. That is to say, the $CO_2$ adsorbent 102*b* exists in a dispersed state in the working electrode binder 102*c*. A mixture of the $CO_2$ adsorbent 102*b* and the working electrode binder 102*c* is formed, and the mixture is adhered to the working electrode base material 102*a* as a mixed layer of the $CO_2$ adsorbent 102*b* and the working electrode binder 102*c*. The $CO_2$ adsorbent 102*b* is in a state where it is held inside the working electrode binder 102*c*, and the $CO_2$ adsorbent 102*b* can be firmly held in the working electrode binder 102*c*.

In the present embodiment, the working electrode binder 102*c* has $CO_2$ permeability, which enables permeation of $CO_2$. Further, the working electrode binder 102*c* of the present embodiment has $CO_2$-selective permeability, which enables $CO_2$ to be selectively permeated among the plurality of types of gases contained in the $CO_2$-containing gas. In addition, the working electrode binder 102*c* of the present embodiment has hydrophobicity.

Figure 4:
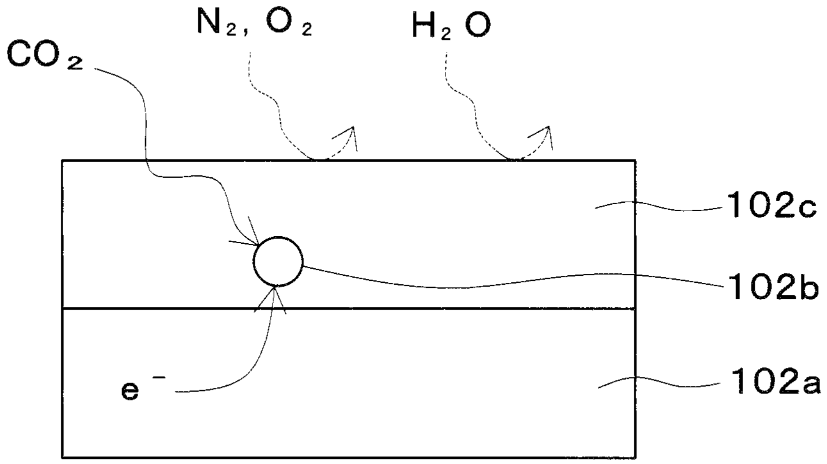
FIG. 4 is a diagram showing $CO_2$-selective permeability and hydrophobicity of a negative electrode binder.

As shown in FIG. 4, the $CO_2$ contained in the $CO_2$-containing gas permeates the working electrode binder 102*c*, and is capable of reaching the $CO_2$ adsorbent 102*b* present inside the working electrode binder 102*c*. On the other hand, the gases other than $CO_2$ contained in the $CO_2$-containing gas (such as $N_2$ and $O_2$) are unable to permeate the working electrode binder 102*c*, which has $CO_2$-selective permeability. Further, when moisture ($H_2O$) is present in the $CO_2$-containing gas, the moisture does not permeate the working electrode binder 102*c*, which has hydrophobicity.

A non-fluid material that does not have fluidity can be used as the working electrode binder 102*c*. Examples of the non-fluid material include gel-state materials and solid-state materials. Examples of gel-state materials include ionic liquid gels. Examples of solid-state materials include solid electrolytes and electrically conductive resins.

When a solid electrolyte is used as the working electrode binder 102*c*, it is desirable to use an ionomer made of a polymer electrolyte or the like in order to increase the contact area with the $CO_2$ adsorbent 102*b*. When an electrically conductive resin is used as the working electrode binder 102*c*, an epoxy resin, or a fluororesin such as polytetrafluoroethylene (PTFE) or polyvinylidene fluoride (PVDF) containing Ag or the like as an electrically conductive filler may be used.

The raw material of the working electrode binder 102*c* may be a liquid substance having fluidity. In this case, the $CO_2$ adsorbent 102*b* may be dispersed and mixed with the raw material of the working electrode binder 102*c*, and may be attached to the working electrode base material 102*a* by impregnation, coating, or the like. Then, the raw material of the working electrode binder 102*c* can be subjected to gelation or solidified under predetermined conditions. The predetermined conditions can be conditions such as a specific pressure, a specific temperature, and a specific time in which the raw material of the working electrode binder 102*c* undergoes gelation or becomes solidified.

Figure 5:
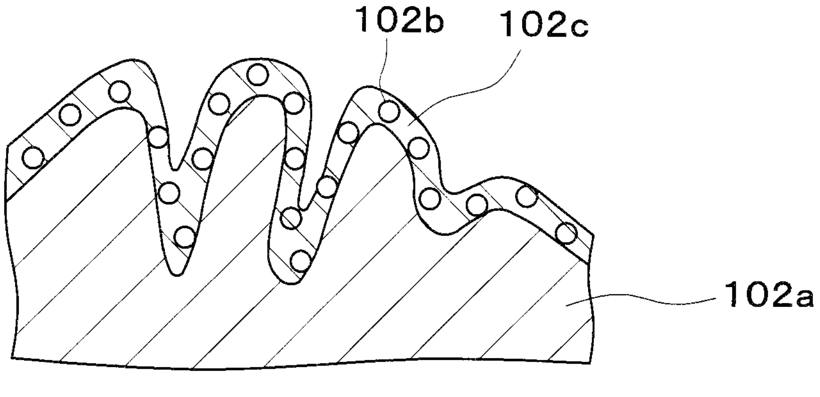
FIG. 5 is an enlarged cross-sectional view showing the vicinity of the surface of the negative electrode of the electrochemical cell.

As shown in FIG. 5, the working electrode binder 102*c* enters and becomes fixed to the voids of the pores and irregularities formed in the working electrode base material 102*a*. The working electrode binder 102*c* can generate a mechanical binding force with the working electrode base material 102*a* due to an anchoring effect.

In the present embodiment, an ionic liquid gel obtained by gelation of an ionic liquid can be used as the working electrode binder 102*c*. An ionic liquid gel is a gel-state structure in which an ionic liquid is held in a polymer network structure.

The structure disclosed in JP 2015-25056 A can be preferably used as the ionic liquid gel. In this structure, an ionic liquid is held in a three-dimensional network structure composed of two different types of polymer chains. The three-dimensional network structure includes a first network structure formed by condensation polymerization, and a second network structure formed by radical polymerization.

Tetraethoxyorthosilicate (TEOS) can be used as the monomer subjected to condensation polymerization. TEOS also functions as a cross-linking agent in condensation polymerization.

N,N-dimethylacrylamide (DMAAm) can be used as the monomer subjected to radical polymerization. In radical polymerization, N,N'-methylenebisacrylamide (MBAA) can be used as the cross-linking agent, and 2,2'-azobis(isobutyronitrile) (AIBN) can be used as the initiator.

The ionic liquid constituting the ionic liquid gel functions as a solvent for the monomer constituting the first network structure and the monomer constituting the second network structure. Then, after the first network structure and the second network structure are formed, the first network structure and the second network structure become entangled with each other, and the ionic liquid becomes included in these network structures.

Examples of the ionic liquid constituting the ionic liquid gel include 1-ethyl-3-methylimidazolium bis(trifluoromethanesulfonyl)imide ([EMIM][$Tf_2N$]), 1-butyl-3-methylimidazolium bis(trifluoromethanesulfonyl)imide ([BMIM]) [$Tf_2N$]), and 1-butyl-3-methylimidazolium tetrafluoroborate ([BMIM][$BF_4$]).

In order to impart hydrophobicity to the working electrode binder 102*c*, it is desirable to use a hydrophobic ionic liquid as the ionic liquid constituting the ionic liquid gel. As the hydrophobic ionic liquid, [EMIM][$Tf_2N$] or [BMIM] [$Tf_2N$] can be used.

The ionic liquid gel exemplified in the present embodiment can be obtained by independently progressing the condensation polymerization of the monomer constituting the first network structure (for example, TEOS), and the radical polymerization of the monomer constituting the second network structure (for example, DMAAm) in the ionic liquid. In the present embodiment, the method for producing the ionic liquid gel includes a step for mixing the monomer constituting the first network structure and the monomer constituting the second network structure with the ionic liquid, a step for forming the first network structure by condensation polymerization, and a step for forming the second network structure by radical polymerization. The radical polymerization may be carried out after the condensation polymerization, or the condensation polymerization and the radical polymerization may be carried out at the same time.

Returning to FIG. 3, the counter electrode 103 has the same configuration as the working electrode 102, and is provided with a counter electrode base material 103*a*, an electrically active auxiliary material 103*b*, and a counter electrode binder 103*c*.

The counter electrode base material 103*a* is an electrically conductive material, and the same material as the working electrode base material 102*a* may be used, or a different material may be used. The counter electrode binder 103*c* may be a material which is capable of holding the electrically active auxiliary material 103*b* in the counter electrode base material 103*a*, and has electrical conductivity. The counter electrode binder 103*c* may use the same material as the working electrode binder 102*c*, or may use a different material.

The electrically active auxiliary material 103*b* has the opposite redox state to the $CO_2$ adsorbent 102*b*, and is an auxiliary electrically active species that exchanges electrons with the $CO_2$ adsorbent 102*b*. Examples of the electrically active auxiliary material 103*b* include metal complexes that enable the transfer of electrons by changing the valence of the metal ion. Examples of such a metal complex include cyclopentadienyl metal complexes such as ferrocene, nickelocene and cobaltocene, and porphyrin metal complexes. In the present embodiment, polyvinyl ferrocene as shown below can be specifically used as the electrically active auxiliary material 103*b*.

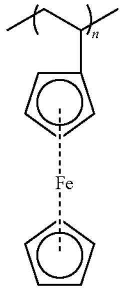

The insulating layer 104 is arranged between the working electrode 102 and the counter electrode 103, and separates the working electrode 102 and the counter electrode 103. The insulating layer 104 prevents physical contact between the working electrode 102 and the counter electrode 103, and suppresses electrical short circuiting.

As the insulating layer 104, a separator or a gas layer such as air can be used. In the present embodiment, a porous separator is used as the insulating layer 104. Examples of the material of the separator include separators made of cellulose films, polymers, and composite materials made of a polymer and a ceramic.

As shown in FIG. 3, an ion conductive member 106 is provided between the working electrode 102 and the counter electrode 103. The ion conductive member 106 is provided between the working electrode base material 102*a* and the counter electrode base material 103*a* via the insulating layer 104.

The ion conductive member 106 contacts the $CO_2$ adsorbent 102*b* inside the working electrode base material 102*a*. The ion conductive member 106 has ionic conductivity, and promotes conduction to the $CO_2$ adsorbent 102*b*. The ions contained in the ion conductive member 106 do not directly react with the functional group contained in the $CO_2$ adsorbent 102*b* that binds to $CO_2$.

A non-fluid material that does not have fluidity can be preferably used as the ion conductive member 106. Examples of the non-fluid material include gel-state materials and solid-state materials, such as ionic liquid gels and solid electrolytes. The ion conductive member 106 may use the same material as the working electrode binder 102*c*, or may use a different material to the working electrode binder 102*c*.

Figure 6:
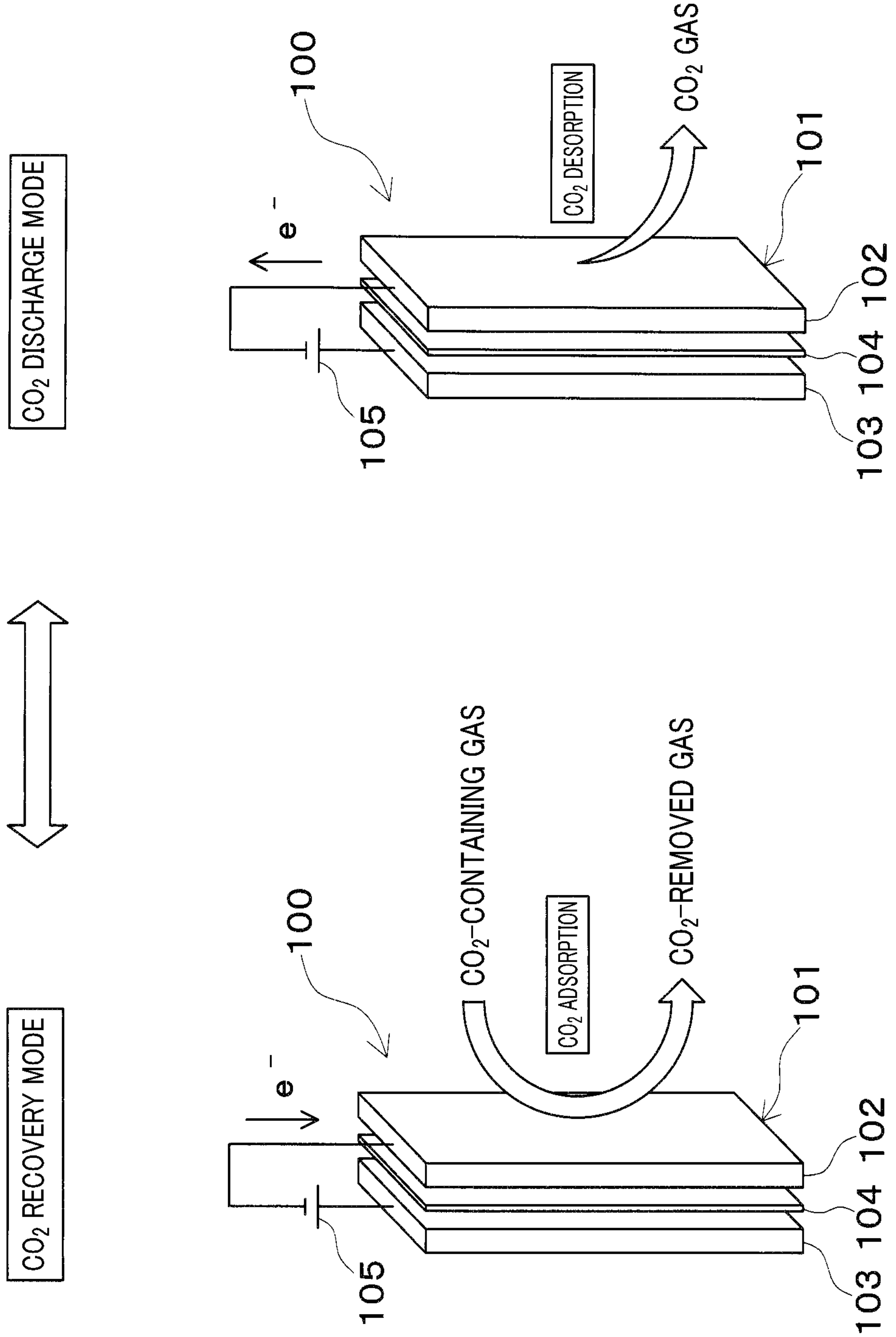
FIG. 6 is a diagram for describing the operation in a $CO_2$ recovery mode and a $CO_2$ discharge mode of the $CO_2$ recovery device.

Next, the operation of the carbon dioxide recovery system 10 of the present embodiment will be described. As shown in FIG. 6, the carbon dioxide recovery system 10 operates by alternatingly switching between a $CO_2$ recovery mode and a $CO_2$ discharge mode. The operation of the carbon dioxide recovery system 10 is controlled by the control device 14.

First, the $CO_2$ recovery mode will be described. In the $CO_2$ recovery mode, the compressor 11 operates to supply the $CO_2$-containing gas to the $CO_2$ recovery device 100. In the $CO_2$ recovery device 100, the voltage applied between the working electrode 102 and the counter electrode 103 is set to the first voltage. As a result, the electronic donation by the electrically active auxiliary material 103*b* of the counter electrode 103 and the electronic attraction of the $CO_2$ adsorbent 102*b* of the working electrode 102 can be realized at the same time.

The electrically active auxiliary material 103*b* of the counter electrode 103 discharges electrons to be in an oxidized state, and electrons are supplied from the counter electrode 103 to the working electrode 102. The $CO_2$ adsorbent 102*b* of the working electrode 102 receives electrons to be in a reduced state.

The $CO_2$ adsorbent 102*b* in a reduced state has a high $CO_2$ binding strength, and binds and adsorbs the $CO_2$ contained in the $CO_2$-containing gas. As a result, the $CO_2$ recovery device 100 is capable of recovering $CO_2$ from the $CO_2$-containing gas.

After $CO_2$ is recovered by the $CO_2$ recovery device 100, the $CO_2$-containing gas is discharged from the $CO_2$ recovery device 100 as a $CO_2$-removed gas that does not contain $CO_2$ or whose $CO_2$ concentration has been reduced. The flow path switching valve 12 switches the gas flow path to the atmosphere side, and the $CO_2$-removed gas is discharged from the $CO_2$ recovery device 100 to the atmosphere.

Next, the $CO_2$ discharge mode will be described. In the $CO_2$ discharge mode, the compressor 11 is stopped, and the supply of the $CO_2$-containing gas to the $CO_2$ recovery device 100 is stopped. In the $CO_2$ recovery device 100, the voltage applied between the working electrode 102 and the counter electrode 103 is set to the second voltage. As a result, the electronic donation by the $CO_2$ adsorbent 102*b* of the working electrode 102 and the electronic attraction of the electrically active auxiliary material 103*b* of the counter electrode 103 can be realized at the same time.

The $CO_2$ adsorbent 102*b* of the working electrode 102 discharges electrons to be in an oxidized state. The $CO_2$ binding strength of the $CO_2$ adsorbent 102*b* decreases, and the $CO_2$ is desorbed and discharged. The electrically active auxiliary material 103*b* of the counter electrode 103 receives electrons to be in a reduced state.

The $CO_2$ discharged from the $CO_2$ adsorbent 102*b* is discharged from the $CO_2$ recovery device 100. The flow path switching valve 12 switches the gas flow path to the $CO_2$ utilization device 13 side, and the $CO_2$ discharged from the $CO_2$ recovery device 100 is supplied to the $CO_2$ utilization device 13.

In the $CO_2$ recovery device 100 of the present embodiment described above, the $CO_2$ adsorbent 102*b* is held in the working electrode base material 102*a* by using the working electrode binder 102*c*. As a result, the $CO_2$ adsorbent 102*b* is less likely to become detached from the working electrode base material 102*a*, and a decrease in the amount of $CO_2$ adsorbed by the electrochemical cell 101 over time can be suppressed.

Furthermore, the working electrode binder 102*c* of the present embodiment has electrical conductivity. Consequently, it is possible to prevent the working electrode binder 102*c* from obstructing the flow of electrons between the working electrode base material 102*a* and the $CO_2$ adsorbent 102*b*.

Moreover, in the present embodiment, a gel-state material or a solid-state material is used as the working electrode binder 102*c*. Consequently, the working electrode binder 102*c* is capable of generating a mechanical binding force with the pores and voids formed on the surface of the working electrode base material 102*a* due to an anchoring effect.

In addition, in the present embodiment, an ionic liquid gel is used as the working electrode binder 102*c*. As described above, by using a gel-state material as the binder 102*c*, the $CO_2$ adsorbent 102*b* and the binder 102*c* can be brought into contact with each other more easily, and the electrical conductivity can be improved.

Also, in the present embodiment, the working electrode binder 102*c* has $CO_2$ permeability. Consequently, even when the $CO_2$ adsorbent 102*b* is provided inside the working electrode binder 102*c* and is unable to make direct contact with the $CO_2$-containing gas, $CO_2$ is capable of permeating the working electrode binder 102*c* and reaching the $CO_2$ adsorbent 102*b*. As a result, even when the $CO_2$ adsorbent 102*b* exists inside the working electrode binder 102*c*, $CO_2$ can be recovered by the $CO_2$ adsorbent 102*b*.

Furthermore, in the present embodiment, the working electrode binder 102*c* has $CO_2$-selective permeability. Consequently, it is possible to prevent gases other than $CO_2$ contained in the $CO_2$-containing gas (such as $N_2$ and $O_2$) from reaching the working electrode binder 102*c*. As a result, the $CO_2$ concentration reaching the $CO_2$ adsorbent 102*b* can be increased, and the amount of $CO_2$ adsorbed by the $CO_2$ adsorbent 102*b* can be increased.

Moreover, in the present embodiment, the working electrode binder 102*c* has hydrophobicity. Consequently, even in the presence of moisture ($H_2O$), it is possible to prevent $H_2O$ from reaching the working electrode binder 102*c*. As a result, it is possible to prevent $H_2O$ from reacting preferentially with the $CO_2$ adsorbent 102*b*, and the amount of $CO_2$ adsorbed by the $CO_2$ adsorbent 102*b* can be increased.

In addition, in the present embodiment, the $CO_2$ adsorbent 102*b* and the working electrode binder 102*c* are used as a mixture. As a result, the $CO_2$ adsorbent 102*b* is firmly held inside the working electrode binder 102*c*, and the $CO_2$ adsorbent 102*b* is less likely to become detached from the working electrode base material 102*a*.

Also, in the present embodiment, the ion conductive member 106 is provided between the working electrode 102 and the counter electrode 103, and a gel-state material or a solid-state material is used as the ion conductive member 106. As described above, by using a non-fluid material as the ion conductive member 106, it is possible to prevent elution of the ion conductive member 106 from between the working electrode 102 and the counter electrode 103.

OTHER EMBODIMENTS

The present invention is not limited to the embodiment described above, and various modifications can be made as follows without departing from the spirit of the present invention. Moreover, the means disclosed in the embodiment described above may be appropriately combined to the extent feasible.

Figure 7:
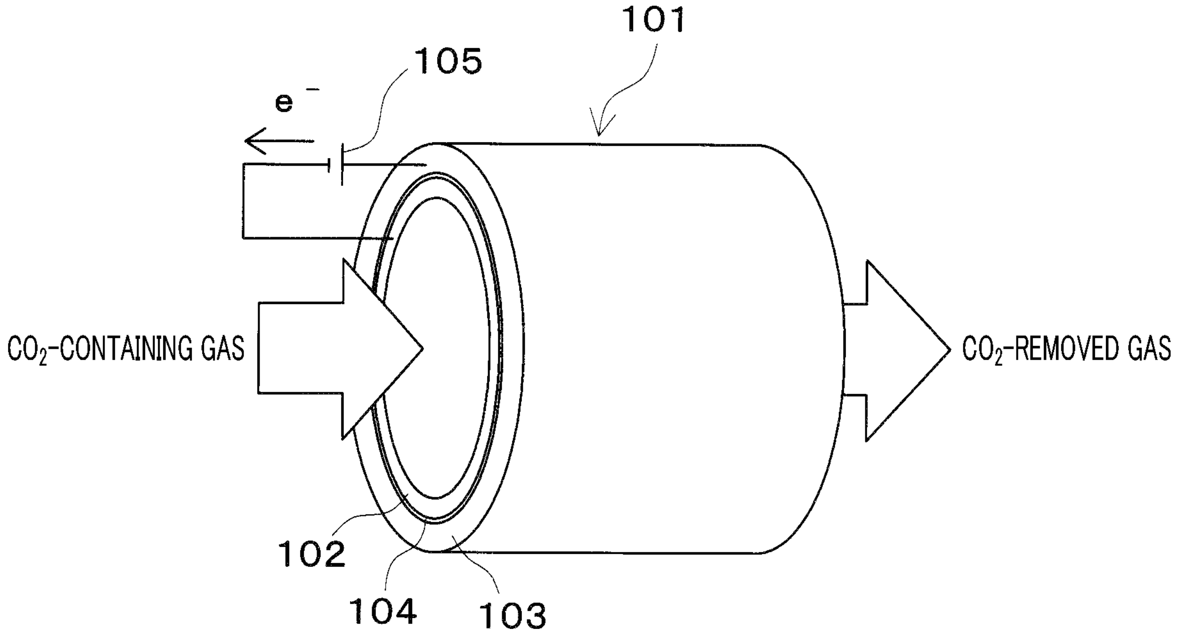
FIG. 7 is a drawing of a modification of the electrochemical cell.

For example, in the embodiment described above, the working electrode 102, the counter electrode 103, and the insulating layer 104 of the electrochemical cell 101 are each plate-shaped members. However, as shown in FIG. 7, the working electrode 102, the counter electrode 103, and the insulating layer 104 may each be cylindrical members. In this case, the working electrode 102 may be arranged on the innermost side, the counter electrode 103 may be arranged on the outermost side, and the insulating layer 104 may be arranged between the working electrode 102 and the counter electrode 103. As a result, the space formed on the inner side of the working electrode 102 can be used as a gas flow path that the $CO_2$-containing gas passes through.

Furthermore, in the embodiment described above, a working electrode binder 102*c* having hydrophobicity has been used. However, the working electrode binder 102*c* does not necessarily have to have hydrophobicity.

Moreover, in the embodiment described above, a working electrode binder 102*c* that selectively allows to $CO_2$ to permeate has been used. However, the working electrode binder 102*c* does not necessarily have to have $CO_2$-selective permeability.

In addition, in the embodiment described above, a configuration has been used in which the $CO_2$ adsorbent 102*b* is arranged inside the working electrode binder 102*c*. However, the $CO_2$ adsorbent 102*b* may be arranged on the surface of the working electrode binder 102*c*. In this case, because the $CO_2$ adsorbent 102*b* is capable of making direct contact with the $CO_2$-containing gas, the working electrode binder 102*c* does not necessarily have to have $CO_2$ permeability.

What is claimed is:

1. A carbon dioxide recovery system that separates $CO_2$ from a $CO_2$-containing gas, by an electrochemical reaction, comprising:

an electrochemical cell comprising a working electrode and a counter electrode;

wherein the working electrode comprises an electrode base material, a $CO_2$ adsorbent, and a binder, application of a voltage between the working electrode and the counter electrode causes electrons to be supplied from the counter electrode to the working electrode, and enables the $CO_2$ adsorbent to bind $CO_2$ thereto as electrons are supplied, the binder comprises an ionomer made of a polymer electrolyte, and the $CO_2$ adsorbent is held in the electrode base material by forming a mixture with the binder comprising the ionomer, the electrochemical cell further comprises an insulating layer and an ion conductive member having ionic conductivity, the insulating layer is provided between the working electrode and the counter electrode and is configured to separate the electrodes from each other, the ion conductive member is provided between the working electrode and the counter electrode via the insulating layer, is configured to be in direct contact with the electrode base material, and contacts the $CO_2$ adsorbent inside the electrode base material, the electrode base material is a porous material, the binder is configured to enter and become fixed to voids of irregularities formed in the electrode base material to generate a mechanical binding force with the electrode base material, the $CO_2$-containing gas contains a plurality of gases other than $CO_2$, and the binder is configured to have $CO_2$-selective permeability, in which gases other than $CO_2$ are unable to permeate the binder to enable $CO_2$ to be selectively permeated.

2. The carbon dioxide recovery system according to claim 1, wherein the binder has hydrophobicity.

3. The carbon dioxide recovery system according to claim 1, wherein the binder and the $CO_2$ adsorbent form a mixture, and the mixture is held in the electrode base material.

4. The carbon dioxide recovery system according to claim 1, wherein the ion conductive member is a gel-state material or solid-state material.

5. The carbon dioxide recovery system according to claim 1, wherein the binder is a solid-state material or a gel-state material containing the $CO_2$ adsorbent and an organic solvent in a dispersed and mixed state, with a raw material of the binder, a liquid substance with fluidity, solidified or subjected to gelation in a state of entering voids of irregularities formed in the electrode base material.

6. The carbon dioxide recovery system according to claim 1, wherein moisture is present in the $CO_2$-containing gas, which moisture is unable to permeate the binder to enable $CO_2$ to be selectively permeated.

7. The carbon dioxide recovery system according to claim 1, wherein the plurality of gases other than $CO_2$ includes at least one of $N_2$ and $O_2$.

* * * * *